US008046028B2

(12) United States Patent (10) Patent No.: US 8,046,028 B2
Kim et al. (45) Date of Patent: Oct. 25, 2011

(54) MOBILE STATION TRANSMITTING FEEDBACK SIGNALS

(75) Inventors: Sung-jin Kim, Suwon (KR); Jun Quiang Li, Yongin (KR); Ki-ho Kim, Seoul (KR); Ho-jin Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 931 days.

(21) Appl. No.: 12/014,455

(22) Filed: Jan. 15, 2008

(65) Prior Publication Data

US 2008/0113626 A1 May 15, 2008

Related U.S. Application Data

(60) Division of application No. 11/504,798, filed on Aug. 15, 2006, now Pat. No. 7,650,167, which is a continuation of application No. 10/531,638, filed as application No. PCT/KR03/02188 on Oct. 18, 2003, now Pat. No. 7,206,607.

(30) Foreign Application Priority Data

Oct. 19, 2002 (KR) ........................ 10-2002-0064009

(51) Int. Cl.
*H04M 1/00* (2006.01)
(52) U.S. Cl. .................................................. 455/562.1
(58) Field of Classification Search ................ 455/562.1
See application file for complete search history.

(56) References Cited

U.S. PATENT DOCUMENTS 5,548,834 A 8/1996 Suard et al.

FOREIGN PATENT DOCUMENTS

KR 2001-0095535 11/2001
KR 2003-0017946 3/2003
KR 2003-0033601 5/2003

OTHER PUBLICATIONS

Siemens: Description of the Eigenbeamformer Concept (update) and Performance Evaluation, TSGR1#19 R1-01-0203; Feb. 27, 2001.
Paul Bender et al., "CDMA/HDR: A Bandwidth Efficient High Speed Wireless Data Service for Nomadic Users", IEEE Communications, vol. 38(7), 70-78, Jul. 2000.
G.J. Foschini et al., "On Limits of Wireless Communications in a Fading Environment When Using Multiple Antennas", Wireless Personal Communications, vol. 6, pp. 311-335, Aug. 1998.
Lal C. Godara, Applications of Antenna Arrays to Mobile Communications, Part I: Performance Improvement, Feasibility, and System Considerations, Proceedings of the IEEE, vol. 85, No. 7, 1031-1097, Jul. 1997.

*Primary Examiner* — William D Cumming
(74) *Attorney, Agent, or Firm* — The Farrell Law Firm, P.C.

(57) ABSTRACT

A mobile communication apparatus that utilizes multiple base station/mobile station antennas and a mobile communication method performed therein are provided. The mobile communication apparatus includes a base station having at least two antennas and at least two mobile stations having at least one antenna, respectively. The base station restores weight information and channel status information from feedback signals received from the mobile stations, determines downlink investigation information that results in maximum transmission channel capacity based on the restored weight information and channel status information, selects mobile stations for simultaneous transmission based on the downlink investigation information, and processes data to be transmitted to the selected mobile stations based on the downlink investigation information.

2 Claims, 10 Drawing Sheets

MOBILE STATION TRANSMITTING FEEDBACK SIGNALS

PRIORITY

This is a division of Ser. No. 11/504,798, filed Aug. 15, 2006, now U.S. Pat. No. 7,650,167, Ser. No. 11/504,798 is a continuation of Ser. No. 10/531,638, filed Apr. 15, 2005, now U.S. Pat. Nos. 7,206,607, Ser. No. 10,531,638 is a national stage entry of PCT/KR2003/002188, International Filing Date: Oct. 18, 2003 claims foreign priority to 10-2002-0064009, filed Oct. 19, 2002.

BACKGROUND OF THE INVENTION

1. Field of the Invention

The present invention relates to mobile communications, and more particularly, to a mobile communication apparatus including multi-antenna base station and mobile stations, which maximizes throughput in a multi-user communication environment based on high-speed downlink wireless packet access, and a mobile communication method therefore.

2. Description of the Related Art

Various technologies are used to maximize throughput in mobile communications. As such, logical improvements using new wireless access and physical improvements using, for example, multiple antennas, have attracted more attention than other methods.

First, as an example of a new wireless access based logical improvement method, next-generation mobile communication system standardization associations have proposed in recent years new standard packet access technologies enabling high-speed packet transmission via downlinks. The $3^{rd}$ Generation Partnership Project (3GPP), an asynchronous standardization association led by Europe and Japan, works for the standardization of high-speed downlink packet access (HSDPA) technology, and the 3GPP2, a synchronous standardization association led by the U.S. works for the standardization of 1× Evolution Data Only/Voice (1×EV-DON) technology. The HSDPA and 1×EV-DON technologies suitable for web-based Internet services are based on high-speed downlink packet access for wireless packet transmission. Since high-speed downlink packet access is optimized for peak throughput as well as average throughput, it can achieve peak throughput in an intermittent wireless packet transmission environment. The implementation of such a high-speed downlink packet access technology basically requires an adaptive modulation & coding (AMC) technology, a hybrid automatic request (HARQ) technology, and a multi-user diversity scheduling technology. Basic technologies for downlink packet access are described in the 3GPP specification, a European IMT-2000 standard, and the article "CDMA/HDR: A Bandwidth Efficient High Speed Wireless Data Service for Nomadic Users" by *P. Bender, P. Black, M. Grob, R. Padovani, N. Sindhushayana*, and *A. Viterbi*, IEEE Communications, Vol. 38(7), 70-78, July, 2000.

Second, unlike the wireless access improvement method enabling the efficient use of bandwidths within a given range, a physical improvement method using multiple antennas increases bandwidth resources using more spatial resources to maximize throughput. Recently, Lucent Technologies verified through intensive research into BLAST (Bell Labs LAyered Space Time) demonstrated that the bandwidth is increased min(N,M) times when using N base station antennas and M mobile station antennas compared to when using a single base station antenna and a single mobile station antenna. Here, min(N,M) means the minimum of N and M. This research ensured the effectiveness of using multiple antennas for peak throughput. The principle of increasing the channel capacity using multiples antennas in a base station and mobile stations can be explained based on a matrix rank criterion. The number of paths is determined by the rank characteristic of the matrix H of channel downlink characteristics of multiple base station and mobile station antennas. A rich scatter environment for mobile communications can be created by a number of uncritical obstacles. In such a rich scatter communication environment, the theoretical maximum capacity $C_{MAX}$ of a multi-antenna communication system including a base station and a single mobile station is expressed as equation (1) below based on Shannon's channel capacity bound principle.

$$C_{MAX} = \log_2 \det\left[I + \frac{1}{\sigma_n^2} H^H P H\right] \quad (1)$$

where I denotes an identity matrix, P denotes a diagonal matrix of power allocation parameters, and $\sigma_n^2$ denotes the variance of noise. Shannon's channel capacity bound principle and Lucent's BLAST technology are described in the article entitled "On Limits of Wireless Communications in a Fading Environment When Using Multiple Antennas," by *G. J Foschini and M. J. Gans*, Wireless Personal Communications, Vol. 6, pp. 311-335, August 1998.

In particular, Lucent's BLAST technology provides maximum channel capacity based on equation (1) in an environment where one base station corresponds to one mobile station. Since the BLAST technology does not require channel information feedback, problems such as delay or erroneous fed-back do not arise. However, in a multi-antenna system based on Lucent's BLAST technology, in which data is transmitted via only one channel between the base station and a mobile station, and no channel information is fed back, it is impossible to apply a nulling method, which forms a principle of multi-antenna systems, and to achieve peak throughput in a multi-user, multi-antenna system environment. In addition, there is a structural limitation in that more mobile station antennas than base station antennas are required. The concept of the nulling principle for multi-antenna systems is described in the article entitled "Applications of Antenna Arrays to Mobile Communications, Part I: Performance Improvement, Feasibility, and System Considerations," by LAL C. GODARA, Proceedings of the IEEE, Vol. 85, No. 7, 1031-1097, July 1997 (refer to D. Null Beamforming on page 1041).

In the above-described physical improvement method using multiple antennas, channel information cannot be fed back to achieve peak throughput in a low-speed Doppler environment including low-speed mobile stations, in which channel switching rarely occurs, or in a high-power environment ensuring minimal channel feedback errors. The problem of lower throughput is considered to be more serious because information fed back from a plurality of mobile stations cannot be simultaneously considered.

To solve the problem of the above-described method that information fed back from a plurality of mobile stations cannot be simultaneously interpreted, there are required the following considerations: (1) separating channel investigation and tracking sections for adaptation to a high-speed Doppler channel environment, (2) how to handle a plurality of mobile stations having unfair packets, (3) quantization using spatial weighting factors for efficient channel information measurement, and (4) compatibility with existing standards. However, it has never been considered so far to generate channel information based on the currently available weight information and channel status information, rather using new channel information, to achieve maximum channel throughput.

SUMMARY OF THE INVENTION

The present invention provides a mobile communication apparatus including a base station with at least two base station antennas and at least two mobile stations each of which has at least one antenna. In the mobile communication apparatus, the downlink characteristics of spatial channels between the base station and at least two mobile stations are considered with respect to every mobile station, thereby solving a problem of delay in optimal beamforming by the base station antenna and in multi-stream data transmission. In addition, according to the present invention, user fairness in data transmission is also considered, and channel information is measured in an easier way, ensuring the nominal throughput for multi-user, multi-antenna systems.

The present invention also provides a mobile communication method performed in the above mobile communication apparatus that include multiple base station and mobile station antennas.

In an aspect of the present invention, there is provided a mobile communication apparatus with multiple base station/mobile station antennas, the apparatus including a base station and at least two mobile stations, comprising: the base station restoring weight information and channel status information from feedback signals received from the mobile stations, determining downlink investigation information that results in maximum transmission channel capacity based on the restored weight information and channel status information, selecting mobile stations for simultaneous transmission from among all of the mobile stations based on the downlink investigation information, and processing data to be transmitted to the selected mobile stations based on the downlink investigation information, wherein the base station includes at least two base station antennas and each of the mobile stations includes at least one mobile station antenna.

In another aspect of the present invention, there is provided a mobile communication apparatus with multiple base station/mobile station antennas, the apparatus including a base station and at least two mobile stations, comprising: the base station restoring weight information and channel status information from feedback signals received from the mobile stations, determining downlink investigation information that results in maximum transmission channel capacity based on the restored weight information and channel status information, selecting mobile stations for simultaneous transmission from among all of the mobile stations based on the downlink investigation information, determining downlink tracking information based on the channel downlink investigation information and restored weight information and channel status information regarding the selected mobile stations, and processing data to be transmitted to the selected mobile stations based on the downlink tracking information, wherein the base station includes at least two base station antennas and each of the mobile stations includes at least one mobile station antenna.

In another aspect of the present invention, there is provided a method of mobile communications between a base station and at least two mobile stations, wherein the base station includes at least two base station antennas, and each of the mobile stations includes at least one mobile station antenna, the method comprising (a) the base station restoring weight information and channel status information from feedback signals received from the mobile stations, determining downlink investigation information that results in maximum transmission channel capacity based on the restored weight information and channel status information, selecting mobile stations for simultaneous transmission from among all of the mobile stations based on the downlink investigation information, and processing data to be transmitted to the selected mobile stations based on the downlink investigation information.

In another aspect of the present invention, there is provided a method of mobile communications between a base station and at least two mobile stations, wherein the base station includes at least two base station antennas, and each of the mobile stations includes at least one mobile station antenna, the method comprising (a) the base station restoring weight information and channel status information from feedback signals received from the mobile stations, determining downlink investigation information that results in maximum transmission channel capacity based on the restored weight information and channel status information, selecting mobile stations for simultaneous transmission from among all of the mobile stations based on the downlink investigation information, determining downlink tracking information based on the channel downlink investigation information and restored weight information and channel status information regarding the selected mobile stations, and processing data to be transmitted to the selected mobile stations based on the downlink tracking information.

The method further comprises (b) each of the mobile stations measuring downlink characteristics of multiple base station/mobile station antenna channels based on pilot channel signals transmitted from the base station, determining the weight information and channel status information based on the downlink characteristics, converting the determined weight information and channel status information into the feedback signals, transmitting the feedback signals to the base station, and detecting high-speed downlink shared channel (HS-DSCH) signals in units of a frame based on the downlink characteristics, and a first control signal and data signals, which are transmitted from the base station.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF AN EXEMPLARY EMBODIMENT

The structure and operation of a mobile communication apparatus that utilizes multiple base station and mobile station antennas, and a mobile communication method therefore according to the present invention will be described in detail with reference to the appended drawings.

Figure 1:
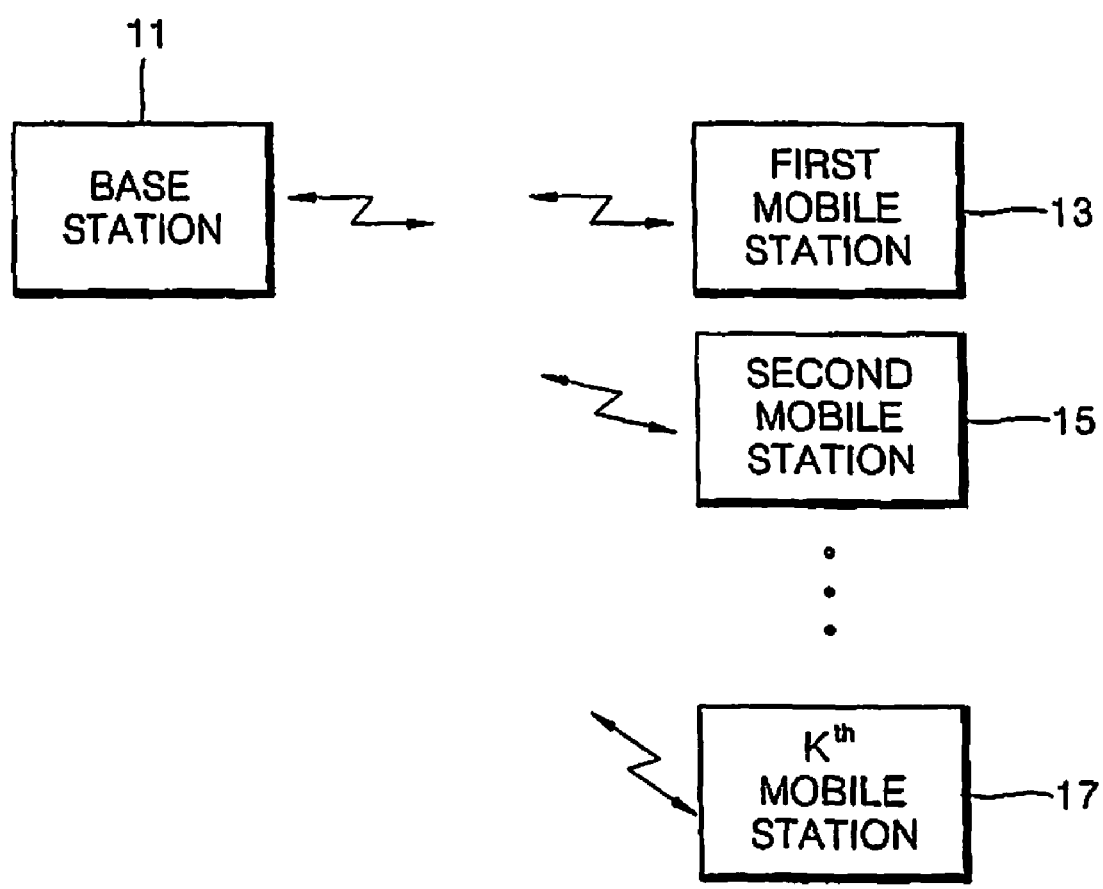
FIG. 1 is a block diagram of a mobile communication apparatus according to the present invention.

As shown in FIG. 1, which is a block diagram of a mobile communication apparatus according to an embodiment of the present invention, the mobile communication apparatus includes a base station 11, a first mobile station 13, a second mobile station 15 through a $K^{th}$ mobile station 17. Each of the K mobile stations, where K is an integer of 2 or greater, performs the same function. According to the present invention, the number of mobile station antennas, $M(k_u)$, in each of the mobile stations 13 through 17 may be greater than 1 and smaller than the number of base station antennas, B, in the base station 111, i.e., $1 \leq M(k_u) < B$. The number of mobile station antennas $M(k_u)$ may be greater than or equal to the number of base station antennas B, i.e., $M(k_u) \geq B$. $M(k_y)$ is a positive integer that is greater than or equal to 1, B is a positive integer that is greater than or equal to 2, and $k_u$ denotes mobile station's ID number, where $1 \leq k_u \leq K$.

Figure 2:
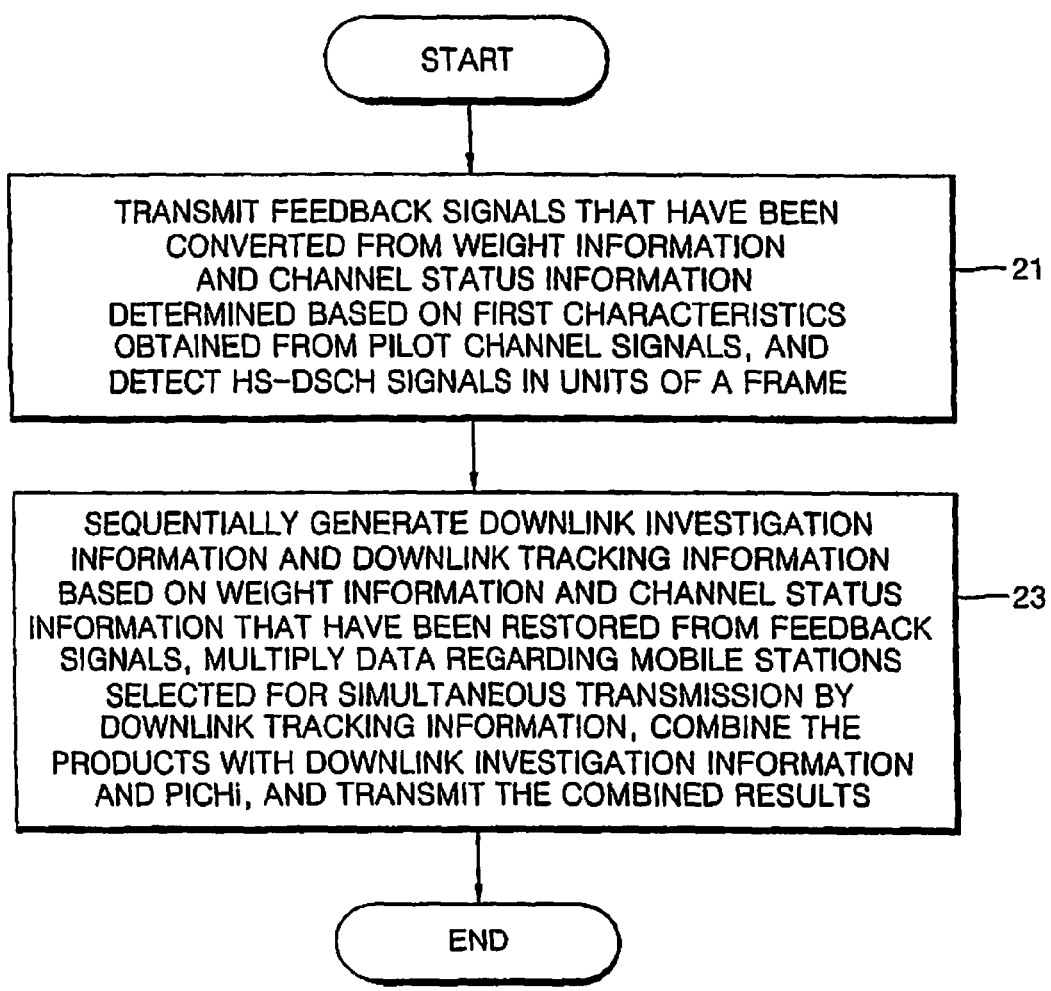
FIG. 2 is a flowchart of a mobile communication method according to the present invention performed in the mobile communication apparatus in FIG. 1.

FIG. 2 is a flowchart illustrating a mobile communication method according to an embodiment of the present invention performed in the mobile communication apparatus in FIG. 1. The mobile communication method includes determining and transmitting weight information and channel status information and detecting high-speed downlink shared channel (HS-DSCH) signals (step 21) and adding pilot channel (PICH) signals to data signals generated based on the weight information and channel status information restored from feedback signals and transmitting the added results (step 23).

Step 23 in FIG. 2 that is performed in the base station 11 will now be described prior to a description on step 21.

The base station 11 restores the weight information and channel status information determined in each of the first through $K^{th}$ mobile stations 13 through 17 from the feedback signals received from each of the first through $K^{th}$ mobile stations 13 through 17 based on the channel downlink characteristics of the multiple base station and mobile station antennas (hereinafter, referred to as first characteristics $H(k_u)$, where $H(k_u)$ is a matrix with $1 \leq k_u \leq K$). Hereinafter, capital bold letters indicate matrices, small bold letters indicate vectors, and non-bold symbols indicate scalars. The base station 11 also generates downlink investigation information that ensures maximum throughput based on the restored weight information and channel status information regarding each of the mobile stations. The maximum throughput may be calculated in consideration of transmission packet fairness information. The base station 11 selects data regarding mobile stations for simultaneous transmission from among data regarding all of the mobile stations based on the generated downlink investigation information. The base station 11 generates downlink tracking information appropriate to instant channel situations based on feedback signals received from the mobile stations selected for simultaneous transmission. The base station 11 matrix-multiplies the data regarding the selected mobile stations by the downlink tracking information that is mutual weight information, adds mobile station selection information and pilot channel signals PICHi to the products (also referred to as data signals) of the multiplication, and transmits the added results to the first through $K^{th}$ mobile stations 13 through 17 in units of a frame.

The downlink investigation information includes mobile station selection information described later, i.e., information regarding mobile stations to which data will be concurrently transmitted. The first characteristics $H(k_u)$ means the phase and magnitude of channels through which data are transmitted from the base station 11 to arbitrary mobile stations 13 through 17.

The first characteristics $H(k_u)$ that is a matrix consisted of base station antenna channels in columns and mobile station antenna channels in rows. In other words, the column components of the first characteristics matrix $H(k_u)$ are derived from the space formed by the base station antennas, and the row components thereof are derived from the space formed by the mobile station antenna. The pilot channel signals $PICH_i$ may be common pilot channel (CPICH) signals, dedicated common pilot channel (DCPICH) signals, secondary common pilot channel (SCPICH) signals, etc.

In another embodiment of the base station 11, instead of generating the downlink tracking information, mutual weight information contained in the downlink investigation information may be matrix-multiplied by the data regarding the selected mobile stations.

The first through $K^{th}$ mobile stations 13 through 17 may be implemented in any structure provided that they ensures the base station 11 to perform the above operations and that they can determine the weight information and channel status information based on the first characteristics $H(k_u)$. Step 21 in FIG. 2 performed in the first through $K^{th}$ mobile stations 13 through 17 will now be described.

Each of the first through $K^{th}$ mobile stations 13 through 17 measures the first characteristics $H(k_u)$ based on the PICH signals transmitted from the base station 11 and determines based on the measured first characteristics $H(k_u)$ the weight information and channel status information that ensure peak throughout to each of the channels connecting the base station and mobile station antennas. Each of the first through $K^{th}$ mobile stations 13 through 17 converts the determined weight information and channel status information into feedback signals and transmits them to the base station 11. Each of the first through $K^{th}$ mobile stations 13 through 17 generates a high-speed downlink shared channel (HS-DSCH) signal in units of a frame based on the first characteristics $H(k_u)$, and a first control signal and data signals, which are received from the base station 11.

Each of the first through $K^{th}$ mobile stations 13 through 17 analyses the first control signal received through the mobile station antennas to determine whether a signal transmitted from the base station 11 is correctly addressed thereto. The HS-DSCH signal reflects the second and third characteristics of channels. The second characteristics imply that the transmission of data through a channel is completed without requiring channel switching because the length of a data frame, i.e., the unit of data transmission, is much shorter than the coherence time of a general Doppler channel. The third characteristics are related to the non-continuous, burst transmission of data through a channel commonly owned by all of the mobile stations 13 through 17 belonging to the base station 11.

For the convenience of understanding the present invention, embodiments of the first, second through $K^{th}$ mobile station 13 through 17 in FIG. 1 and step 21 will be described first, followed by descriptions on embodiments of the base station 11 and step 23.

Figure 3:
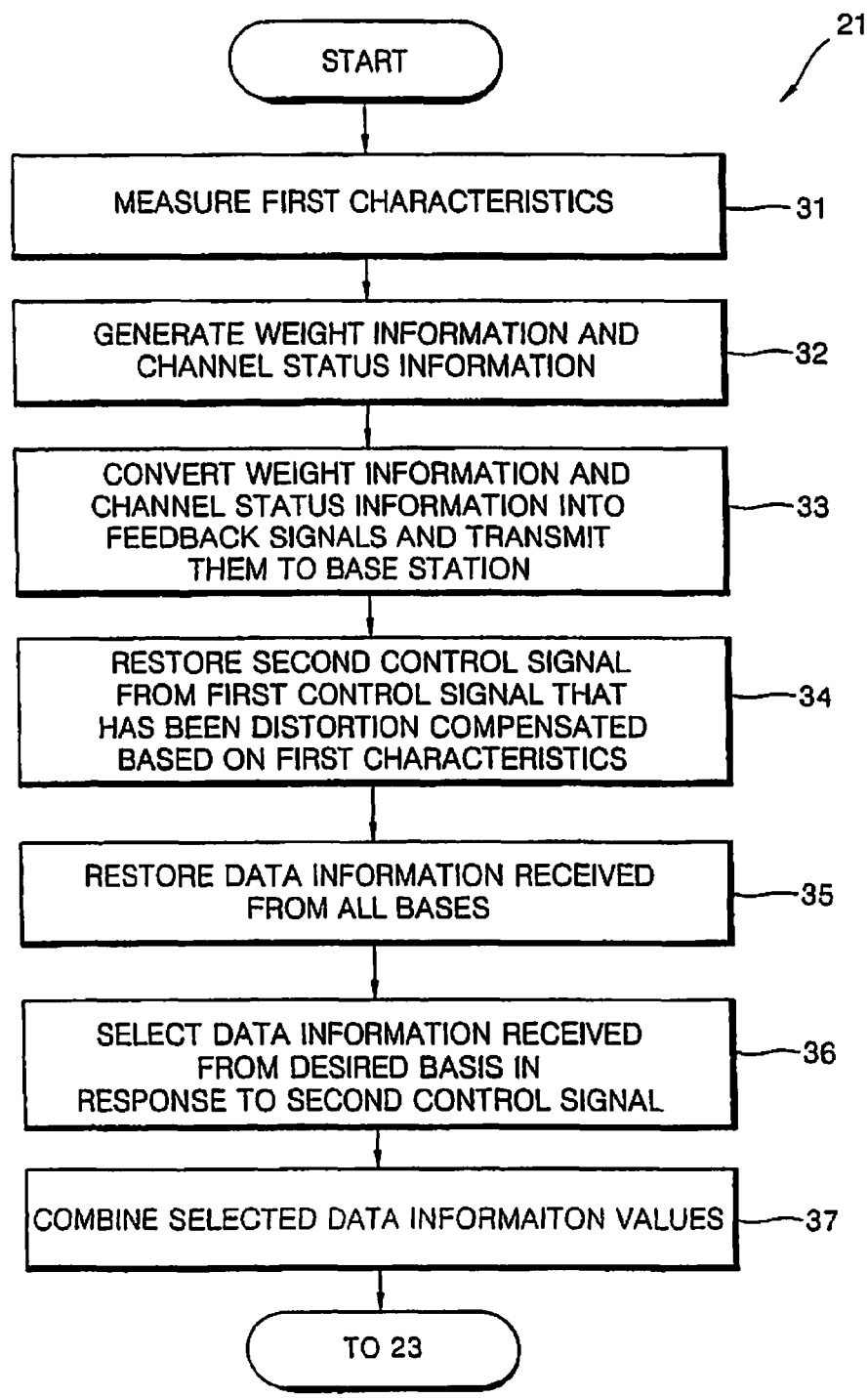
FIG. 3 is a flowchart of an embodiment of step 21 in FIG. 2 according to the present invention.

FIG. 3 is a flowchart illustrating an embodiment of step 21 in FIG. 2 according to the present invention, which includes transmitting the weight information and channel status information determined based on the first characteristics H(k) to the base station 11 (steps 31 through 33) and selecting and combining desired data information from among data information restored based on the data signals transmitted from the base station 11 (steps 34 through 37).

Figure 4:
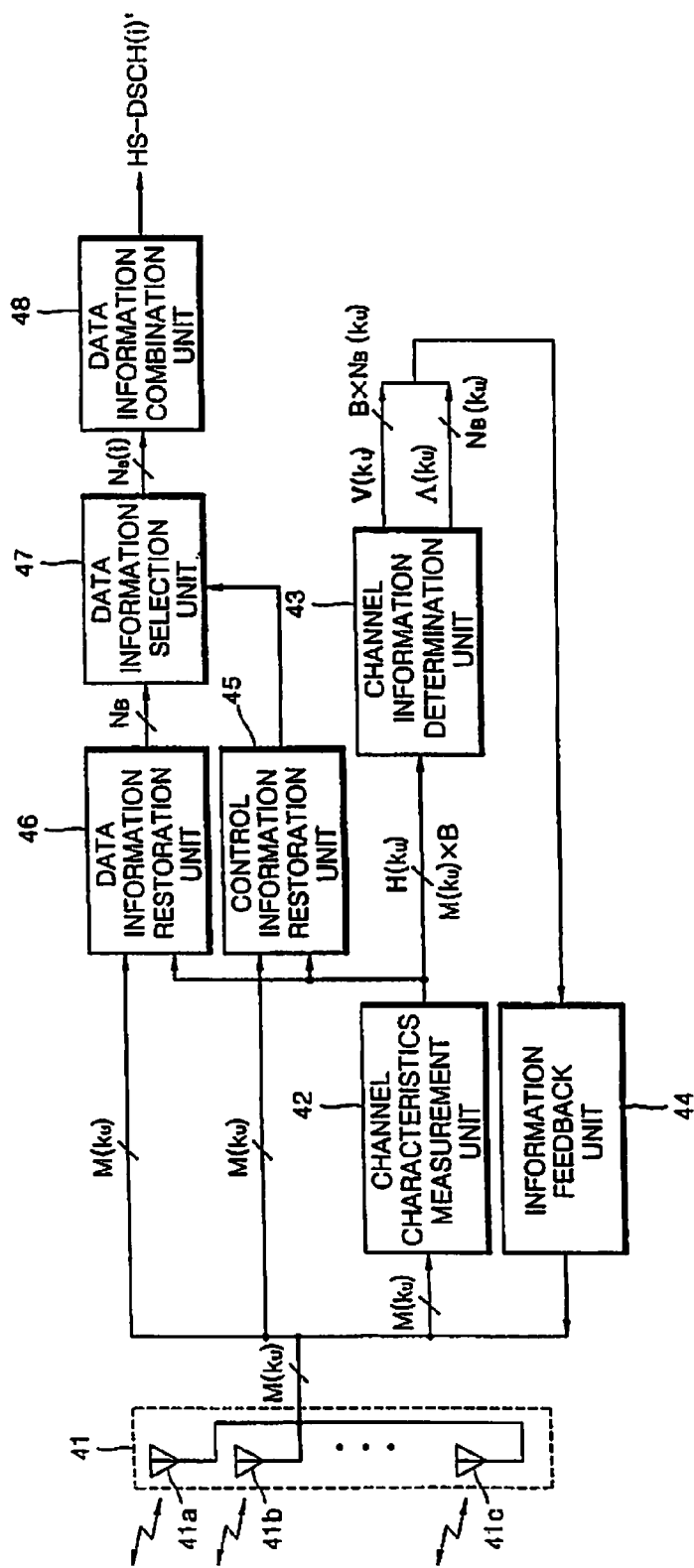
FIG. 4 is a block diagram of an embodiment of a first, second, . . . , or $K^{th}$ mobile station in FIG. 1 according to the present invention.

FIG. 4 is a block diagram of an embodiment of the first through K$^{th}$ mobile station 13 through 17 in FIG. 1, which includes an antenna array 41, a channel characteristics measurement unit 42, a channel information determination unit 43, an information feedback unit 44, a control information restoration unit 45, a data information restoration unit 46, a data information selection unit 47, and a data information combination unit 48.

The operation of the first, second through K$^{th}$ mobile station 13 through 17 having the structure of FIG. 4 will be described in connection with the flowchart of FIG. 3.

In particular, the antenna array 41 in FIG. 4 includes M($k_u$) mobile antennas 41a through 41c. The antenna array 41 receives the PICH signals, the data signals, and the first control signal transmitted from the base station 11. The channel characteristics measurement unit 42 measures the first characteristics H($k_u$) based on the PICH signals received via the antenna array 41 from the base station 11 and outputs the measured first characteristics H($k_u$) to the channel information determination unit 43, the control information restoration unit 45, and the data information restoration unit 46 (step 31).

The channel information determination unit 43 determines the weight information V($k_u$) and channel status information Λ($k_u$) that maximize throughput based on the first characteristics H($k_u$), which have been compressed to be fed back, and outputs the determined weight information V($k_u$) and channel status information Λ($k_u$) to the information feedback unit 44 (step 32). The weight information V($k_u$) and channel status information Λ($k_u$) are determined by decomposing the first characteristics H($k_u$) into U($k_u$)Λ($k_u$)V$^H$($k_u$) using a singular value decomposition method.

N$_B$($k_u$) is smaller than or equal to B and grater than or equal to 1, and the number of vectors and the number of gain values in a basis matrix are both smaller than or equal to B. This is conceptually the same as when some gain values become null depending on the first characteristics H($k_u$), which are the downlink channel characteristics of the base station/mobile station antennas. In both the cases, the number of vectors in the basis matrix and the number of gain values may be expressed as N$_B$($k_u$).

The information feedback unit 44 converts the weight information V($k_u$) and channel status information Λ($k_u$) received from the channel information determination unit 43 into feedback signals that are suitable to be fed back to the base station 11 using a general communication signal processing technique and transmits the converted feedback signals via the mobile station antenna array 41 to the base station 11 (step 33). To perform step 33, the information feedback unit 44 may format the weight information V($k_u$) and channel status information Λ($k_u$) received from the channel information determination unit 43, time-division-multiplex the formatted results, and transmit the time-division-multiplexed results as the feedback signals via the mobile station antenna array 41 to the base station 11. Alternatively, the information feedback unit 44 may apply code division multiplexing or frequency division multiplexing, instead of time division multiplexing, to the formatted weight information V($k_u$) and channel status information Λ($k_u$) to generate the feedback signals.

The control information restoration unit 45 compensates for a distortion of the first control signal, which has been received through the mobile station antenna array 41 from the base station 11, using the first characteristics H($k_u$) input from the channel characteristics measurement unit 42, restores a second control signal from the distortion-compensated first control signal, and outputs the restored second control signal to the data information selection unit 80 (step 34). The second control signal includes information as to whether the data signals received by the mobile station are assigned thereto and information on a basis from which the mobile station receives the data signals. The second control signal may be restored from the first control signal using a general multi-antennal signal process, which will be also used in step 35 described later.

The data information restoration unit 46 restores data information that is received from all bases from the data signals received through the mobile station antenna array 41 from the base station 11 and the first characteristics H($k_u$) input from the channel characteristics measurement unit 42 and outputs the restored data information to the data information selection unit 47 (step 35). The data signals received from the base station 11 are expressed as r(k) in equation (2) below and can be modelled using equation (3) below.

$$r(k)=[r(1,k)r(2,k)\ldots r(N,k)]^T \quad (2)$$

where r(n,k) denotes a data signal received via an n$^{th}$ antenna of the K$^{th}$ mobile station.

$$r(k)=H(k)x+n(k)=U(k)\Lambda(k)V^H(k)x+n(k) \quad (3)$$

where n(k) denotes a noise component, and U(k)Λ(k)V$^H$(k) is the result of singular value decomposition (SVD), which is a general matrix operation, on the first characteristics H($k_u$), and x is modelled as in equation (4) below. SVD in multi-antenna systems is described in an article entitled "Fading Correlation and Its effect on the Capacity of Multielement Antenna Systems" by *Da-Shian Shiu, Gerard J Foschiini, Michael J. Gans*, and *Josep M. Kahn*, IEEE Transactions on Comm. Vol. 48, No. 3, 502-513, March 2003.

$$x=Wd \quad (4)$$

where W is an optimal basis matrix generated in the base station 11 and d denotes data information.

Referring back to FIGS. 3 and 4, the data information selection unit 47 selects data information which is received from a desired basis among the data information from every basis, which is received from the data information restoration unit 46, in response to the second control signal, and outputs N$_e$(k) data information values received from the desired basis, where 0≦N$_e$(i)≦N, to the data information combination unit 48 (step 36).

The data information combination unit 48 combines the selected data information values output from the data information selection unit 47 over a predetermined period of time T$_{BLOCK}$ that corresponds to the length of a frame, and outputs the combined result as a high-speed downlink shared channel signal HS-DSCH(i)' of the corresponding mobile station (step 37).

Unlike the step 21 illustrated in FIG. 3, steps 34 and 37 may be performed while steps 32 and 33 are performed. Alternatively, steps 34 through 37 may precede steps 32 and 33.

Operations of the base station 11 in FIG. 1 and step 23 in FIG. 2 according to the present invention will now be described with reference to FIGS. 5 and 6.

Figure 5:
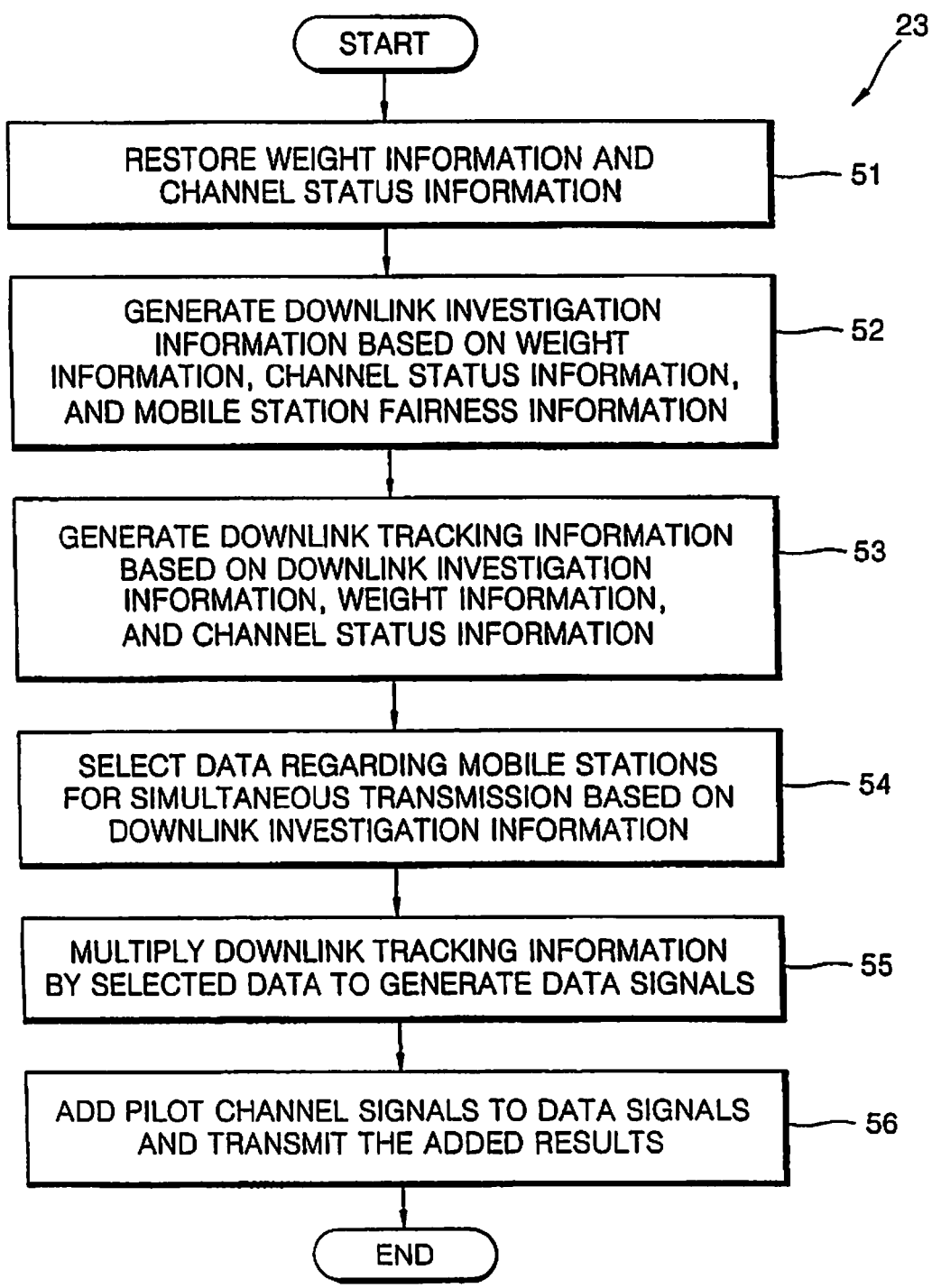
FIG. 5 is a flowchart of an embodiment of step 23 in FIG. 2 according to the present invention.

FIG. 5 is a flowchart illustrating step 23 in FIG. 2 according to the present invention, which includes generating the downlink investigation information and downlink tracking information based on the restored weight information and channel status information (steps 51 through 53), selecting data regarding desired mobile stations (step 54), processing the selected data based on the downlink tracking information to generate data signals (step 55), and adding mobile station selection information contained in the downlink investigation information, and pilot channel signals to the data signals and transmitting the added results to the corresponding mobile station (step 56).

In step 23, step 53 may be not performed. In other words, step 23 may include generating the downlink investigation information based on the restored weight information and channel status information (steps 51 and 52), selecting data regarding desired mobile stations (step 54), processing the selected data based on the mutual weight information contained in the downlink investigation information to generate data signals (step 55), adding mobile station selection information contained in the downlink investigation information, and pilot channel signals to the data signals, and transmitting the added results to the corresponding mobile station (step 56).

In step 23 in FIG. 5, when generating the downlink investigation information in step 52 in each of the above embodiments, mobile station fairness information, i.e., packet fairness information between mobile stations, may be further considered.

Figure 6:
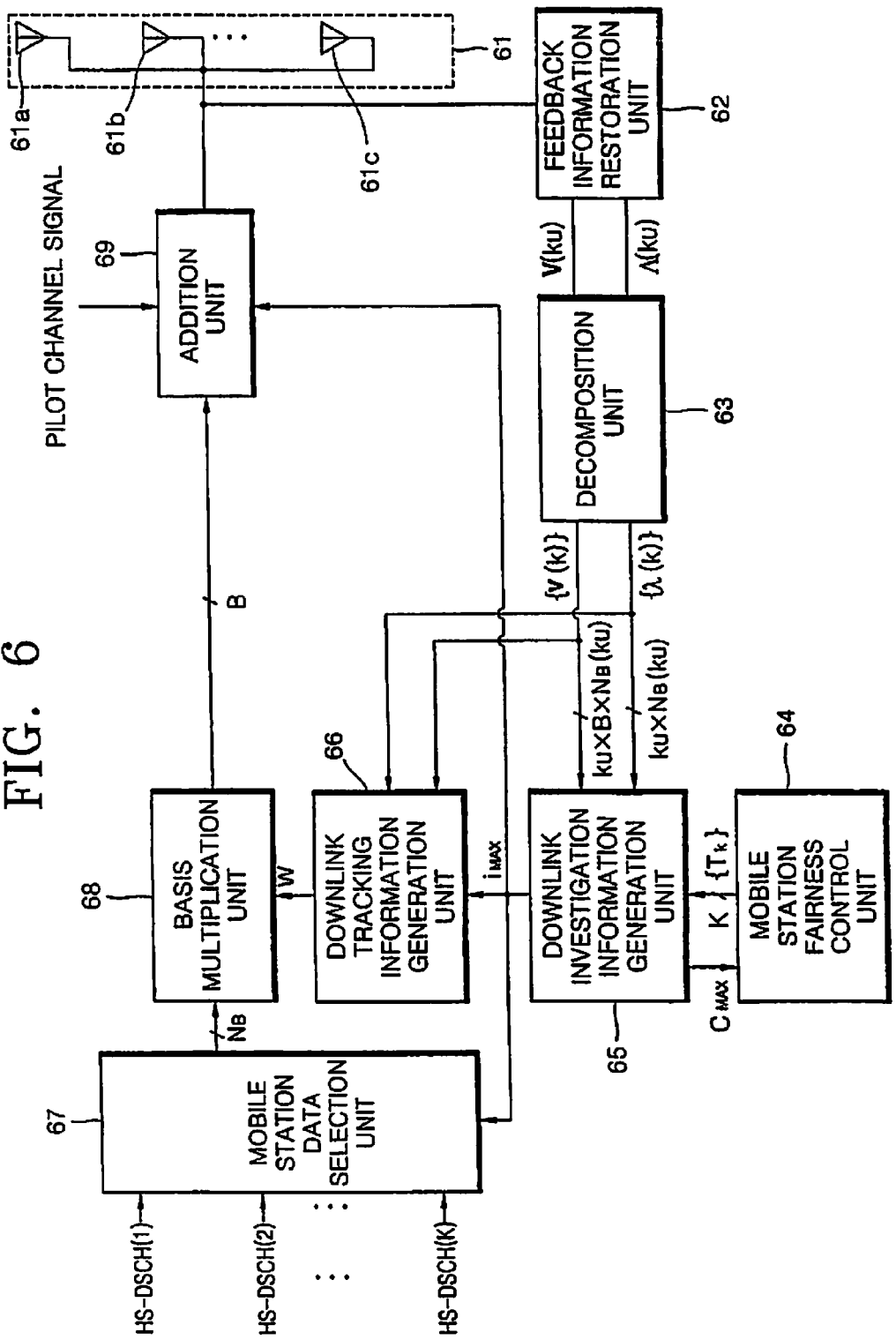
FIG. 6 is a block diagram of a base station in FIG. 1.

FIG. 6 is a block diagram of an operation of the base station 1 in FIG. 1 according to the present invention. As illustrated in FIG. 6, the base station 11 may include an antenna array 61, a feedback information restoration unit 62, a decomposition unit 63, a mobile station fairness control unit 64, a downlink investigation information generation unit 65, a downlink tracking information generation unit 66, a mobile station data selection unit 67, a basis multiplication unit 68, and an addition unit 69. The mobile station fairness control unit 64 is optional.

The operation of the base station 11 in FIG. 6 will be described in connection with the flowchart of FIG. 5.

In FIG. 6, the antenna array 61 includes N base station antennas 61a through 61c. The antenna array 61 receives the feedback signals contained in uplink dedicated physical control channel signals (HS-DPCCH) that are transmitted from the first through $K^{th}$ mobile stations 13 through 17 and transmits the results of adding the mobile station selection information and pilot channel signals to data signals, which are spatially processed HS-DSCH signals, to the first through $K^{th}$ mobile stations 13 through 17.

The feedback information restoration unit 62 restores the weight information $V(k_u)$ and channel status information $\Lambda(k_u)$ from the feedback signals received through the base station antenna array 61 from the first through $K^{th}$ mobile stations 13 through 17 and outputs the restored weight information $V(k_u)$ and channel status information $\Lambda(k_u)$ to the decomposition unit 63.

The decomposition unit 63 decomposes the weight information $V(k_u)$ and channel status information $\Lambda(k_u)$, which are matrices, into weight vectors $v(k)$ and channel status vectors $\lambda(k)$ and outputs the decomposed weight vectors $v(k)$ and channel status vectors $\lambda(k)$ to the downlink investigation information generation unit 65 and the downlink tracking information generation unit 66 (step 51). The restored weight vectors $V(k_u)$ for the individual mobile stations are expressed as $V(k_u)=\{v_1, v_2, \ldots, v_K\}$, and the restored channel status information $\lambda(k_u)$ for the individual mobile stations are expressed as $\Lambda(k_u)=\{\lambda_1, \lambda_2, \ldots, \lambda_K\}$.

In a case where the information feedback unit 44 in FIG. 4 has generated the feedback signals using time division multiplexing, the feedback information restoration unit 62 restores the weight information $V(k_u)$ and channel status information $\Lambda(k_u)$ using time division demultiplexing. In a case where the information feedback unit 44 has generated the feedback signals using code division multiplexing or frequency division multiplexing, instead of time division multiplexing, the feedback information restoration unit 62 restores the weight information $V(k_u)$ and channel status information $\Lambda(k_u)$ using code division demultiplexing or frequency division demultiplexing.

The mobile station fairness control unit 64 generates mobile station fairness information $\{t_k\}$ regarding the individual mobile stations and outputs the mobile station fairness information $\{t_k\}$ to the downlink investigation information generation unit 65. The mobile station fairness information $\{t_k\}$ may be generated in consideration of maximum transmission channel capacity $C_{MAX}$. The mobile station fairness information $\{t_k\}$ consists of packet fairness information regarding each of the mobile stations, which is expressed as $\{t_k\}=\{t_1, t_2, \ldots, t_K\}$. A technique of generating the mobile station fairness information $\{t_k\}$ is disclosed by *Paramod Viswanath, David N. C. Tse*, and *Rajiv Laroia* in an article entitled "Opportunistic Beamforming Using Dumb Antennas", IEEE Transactions on Information Theory, Vol. 48, No. 6, page 1277-1294.

In an investigation section prior to packet transmission to the mobile stations, the downlink investigation information generation unit 65 generates downlink investigation information based on the restored weight vectors $v(k)$ and channel status vectors $\lambda(k)$ input from the feedback information restoration unit 62 and the mobile station fairness information $\{t_k\}$ input from the mobile station fairness control unit 62, and outputs maximum index information $i_{MAX}$, which is mobile station selection information contained in the downlink investigation information, to the downlink tracking information generation unit 66, the mobile station data selection unit 67, and the addition unit 69 (step 52). The maximum index information $i_{MAX}$ consists of $i_{USER}(1)$ through $i_{USER}(N_B)$. The maximum transmission channel capacity information $C_{MAX}$ contained in the downlink investigation information is provided to the mobile station fairness control unit 64.

In a tracking section for packet transmission to the mobile stations, the downlink tracking information generation unit 66 generates mutual weight information W based on the restored weight vectors and channel status vectors input from the feedback information restoration unit 62 and the maximum index information $i_{MAX}$, which is mobile station selection information contained in the downlink investigation information, input from the downlink investigation information generation unit 65, and outputs the generated mutual weight information W to the basis multiplication unit 68 (step 53).

The mobile station data selection unit 67 selects packet channels connected to the mobile stations selected for data transmission, from among the packet channels HS-DSCH(k) for all of the mobile stations, in response to the maximum index information $i_{MAX}$ that is mobile station selection information input from the downlink investigation information generation unit 65, and outputs the packet channels connected to the selected mobile stations to the basis multiplication unit 68 (step 54).

The basis multiplication unit 68 performs matrix-multiplication operation on a set of mutual weight information $\{W\}$ output from the downlink tracking information generation unit 66 and data regarding N mobile stations selected by the mobile station data selection unit 67 and outputs the results of the matrix-multiplication to the addition unit 69 as data signals (step 55). Matrix-multiplication includes multiplying the mutual weight information W by the data regarding N mobile stations selected by the mobile station data selection unit 67 and summing all of the products.

The addition unit 69 adds externally input pilot channel signals $PICH_1$ through $PICH_N$ to the data signals input from the basis multiplication unit 68 and outputs the added results to the base station antenna array 61 (step 56). To this end, the addition unit 69 is implemented with first through $N^{th}$ adders (not shown). An $N^{th}$ adder (not shown) adds a pilot channel signal $PICH_n$ to a data signal input from the basis multiplication unit 68 and outputs the added result to a corresponding antenna 61a through 61c in the base station antenna array 61. The added result input to the base station antenna array 61 from the addition unit 69 is transmitted to the mobile stations 13 through 17 in units of a frame.

In another embodiment of the base station 11, the downlink tracking information generation unit 66 described above may be excluded. In this case, in an investigation section prior to packet transmission to the mobile stations, the downlink investigation information generation unit 65 generates downlink investigation information based on the restored weight vectors v(k) and channel status vectors λ(k) input from the feedback information restoration unit 62 and the mobile station fairness information $\{t_k\}$ input from the mobile station fairness control unit 62. The maximum index information $i_{MAX}$, which is mobile station selection information contained in the downlink investigation information, is output to the mobile station data selection unit 67 and the addition unit 69. The maximum transmission channel capacity information $C_{MAX}$ contained in the downlink investigation information is output to the mobile station fairness control unit 64. The mutual weight information $W_{MAX}$ contained downlink investigation information is output to the basis multiplication unit 68. As in the preceding embodiment, the mobile station fairness control unit 64 is optional.

Operations of Step 52 in FIG. 5 and the downlink investigation information generation unit 65 in FIG. 6 according to the present invention will be described with reference to FIGS. 7 and 8.

Figure 7:
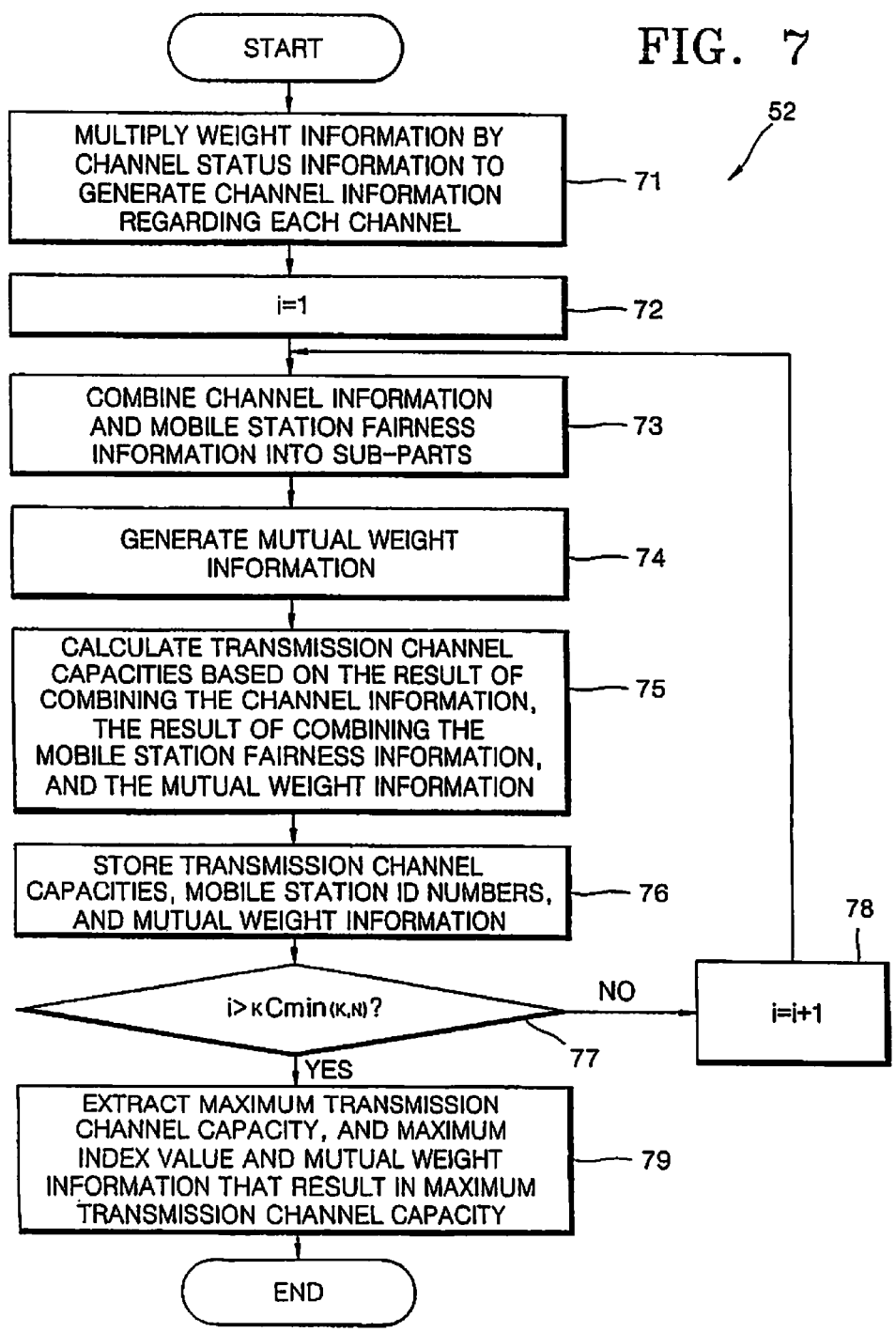
FIG. 7 is a flowchart of step 52 in FIG. 5 according to the present invention.

FIG. 7 is a flowchart illustrating an operation of step 52 in FIG. 5, which includes generating downlink investigation information based on the restored weight information and channel status information and the mobile station fairness information (steps 71 through 79). In another embodiment, the downlink investigation information may be generated based on only the restored weight information and channel status information.

Figure 8:
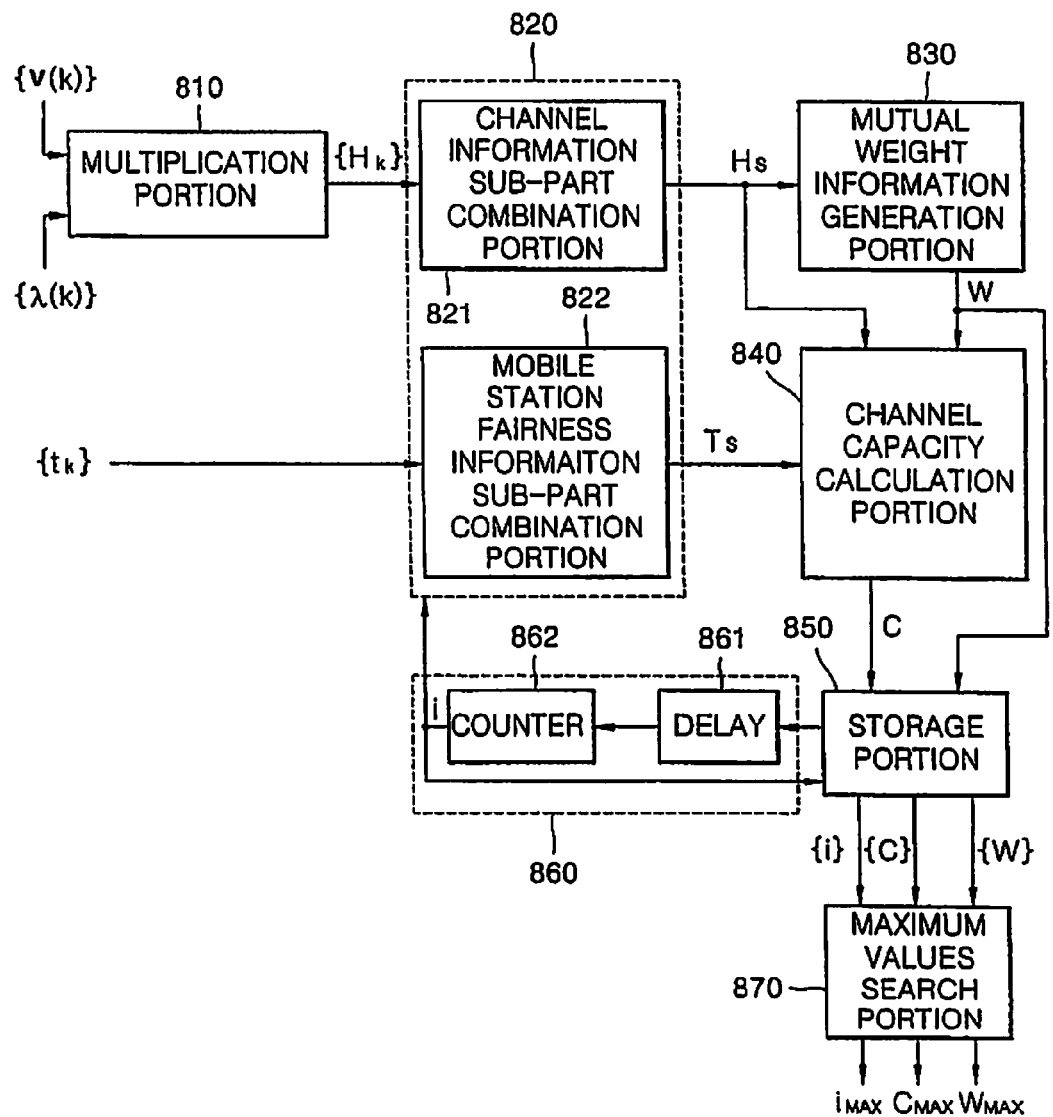
FIG. 8 is a block diagram of an embodiment of a downlink investigation information generation unit in FIG. 6 according to the present invention.

FIG. 8 is a block diagram illustrating the structure of the downlink investigation information generation unit 65 of FIG. 6 according to an embodiment of the present invention, which includes a multiplication portion 810, a sub-part combination portion 820, a mutual weight information generation portion 830, a channel capacity calculation portion 840, a storage portion 850, an index setting portion 860, and a maximum values search portion 870. The sub-part combination portion 820 may be implemented with a channel information sub-part combination portion 820 and a mobile station fairness information sub-part combination portion 822. Alternatively, the sub-part combination portion 820 may be implemented with the channel information sub-part combination portion 820 alone. The index setting portion 860 may be implemented with a delay 861 and a counter 862.

The operation of the downlink investigation information generation unit 65 in FIG. 8 will be described with reference to the flowchart in FIG. 7.

The multiplication portion 810 multiplies the weight information vector $\{v(k)\}$ by the channel status information vector $\{\lambda(k)\}$, as expressed in equation (5), and outputs the product $\{h_k\}$ to the channel information sub-part combination portion 821 of the sub-part combination unit 820 (step 71). If the available channel capacity $(\log_2 (1+\lambda(k))/t_k)$ of a mobile station, which is a ratio of the channel capacity $(\log_2 (+\lambda(k)))$ converted from the corresponding channel status information vector λ(k) to the corresponding mobile station fairness information $t_k$, is smaller than a predetermined threshold value, data transmission to the mobile station is improbable. Therefore, it is unnecessary to perform multiplication itself for such mobile stations.

$$h_k=\lambda(k)*v(k) \tag{5}$$

The counter 862 in the index setting portion 860 increases the index (i) one by one, wherein the index (i) is initialized to 1 (step 72). The index (i) indicates the number of all possible combinations of the first through $K^{th}$ mobile stations 13 through 17. The maximum value of the index (i) is $_kC_{min(K,N)}$.

The channel information sub-part combination portion 821 of the sub-part combination unit 820 combines the product $\{h_k\}$ output from the multiplication portion 810 into sub-parts as expressed in equation (6) with reference to the index (i) provided by the counter 861 and outputs the combined result $H_s$ to the mutual weight information generation unit 830. The mobile station fairness information sub-part combination portion 822 combines the mobility station fairness information $\{t_k\}$ into sub-parts for the individual mobile stations as expressed in equation (7) and outputs the combined result $T_s$ to the channel capacity calculation unit 840 (step 73).

$$H_s=[h_{k(1)}h_{k(2)}\ldots h_{k(N_B)}], k(n_B)\in\{1,2,\ldots,K\} \tag{6}$$

$$T_s=[t_{k(1)}t_{k(2)}\ldots t_{k(N_B)}], k(n_B)\in\{1,2,\ldots,K\} \tag{7}$$

The mutual weight information generation unit 830 generates the float point mutual weight information W based on the combined result $H_s$ received from the channel information sub-part combination portion 821 using equation (8) and outputs the generated mutual weight information W to the channel capacity calculation portion 840 (step 74). To make it easier to measure the channel information, the mutual weight information W may be quantized to a degree that is suitable to be fed back and then output to the channel capacity calculation portion 840.

$$W=H_s^H(H_sH_s^H+N_o/E_b)^+ \tag{8}$$

The channel capacity calculation portion 840 calculates the transmission channel capacity C based on the result of combining the channel information, $H_s$, and the result of combining the mobile station fairness information, $T_s$, which are received from the sub-part combination unit 820, and the mutual weight information W received from the mutual weight information generation portion 830 using equation (9) below, and outputs the calculated transmission channel capacity C to the storage portion 850 (step 75).

$$C = \sum_{n_B=1}^{N_B} \frac{1}{t_{k(n_B)}} \log_2 \left(1 + \frac{E_b|w_{n_B}^H h_{k(n_B)}|}{E_b \sum_{n=1, n\neq n_B}^{N_B} |w_n^H h_{k(n_B)}| + N_a}\right) \tag{9}$$

where $W=[w_1, w_2, \ldots, w_{N_B}]$.

Alternatively, the mobile station fairness information may be not considered by substituting the term $t_k$ in equation (9) with unity.

The storage portion 850 stores the transmission channel capacity C output from the channel capacity calculation portion 840, the mutual weight information W output from the mutual weight information generation unit 830, and the index (i) output from the counter 862 till the index (i) input from the counter 862 is not greater than $$\sum_{n_B=1}^{min(K,N)} {}_KC_{n_B}$$

(step 76).

The storage portion 850 determines whether the index (i) received from the counter 862 is greater than $$\sum_{n_B=1}^{min(K,N)} {}_KC_{n_B}$$

(step 77). If the currently received index (i) is determined to be greater than $$\sum_{n_B=1}^{min(K,N)} {}_KC_{n_B},$$

the storage portion 850 outputs a set of the indices {i} from the first index, i.e., unity, to the last index just preceding the current received index (i), the transmission channel capacity {C}, and the mutual weight information {W} to the maximum values search portion 870. The storage portion 850 outputs to the delay 861 a signal that instructs the counter 862 to increase the index (i) by one. The delay 861 delays the instruction signal for a predetermined clock period and outputs the delayed instruction signal to the counter 862.

The counter 862 increases the index (i) by one in response to the index increasing signal and outputs the increased index to the sub-part combination unit 820 and the storage portion 850 (step 78).

If the index (i) received from the counter 862 is greater than $$\sum_{n_B=1}^{min(K,N)} {}_KC_{n_B},$$

the maximum values search unit 870 searches input data values $i_{MAX}$, $C_{MAX}$, and $W_{MAX}$ that result in maximum transmission channel capacity C in response to the input index {i} among the calculated transmission channel capacities for all possible combinations of the first through $K^{th}$ mobile stations 13 through 17 and outputs the searched input data values $i_{MAX}$, $C_{MAX}$, and $W_{MAX}$ (step 79). The maximum index value IMAX that is a kind of mobile station selection information output from the maximum values search unit 870 is output to the downlink tracking information generation unit 65, the mobile station data selection unit 66, and the addition unit 68. Also, the maximum transmission channel capacity $C_{MAX}$ and the mutual weight information $W_{MAX}$ are transmitted to relevant upper layers.

Operations of step 53 in FIG. 5 and the downlink tracking information generation unit 66 in FIG. 6 according to the present invention will be described with reference to FIGS. 9 and 10.

Figure 9:
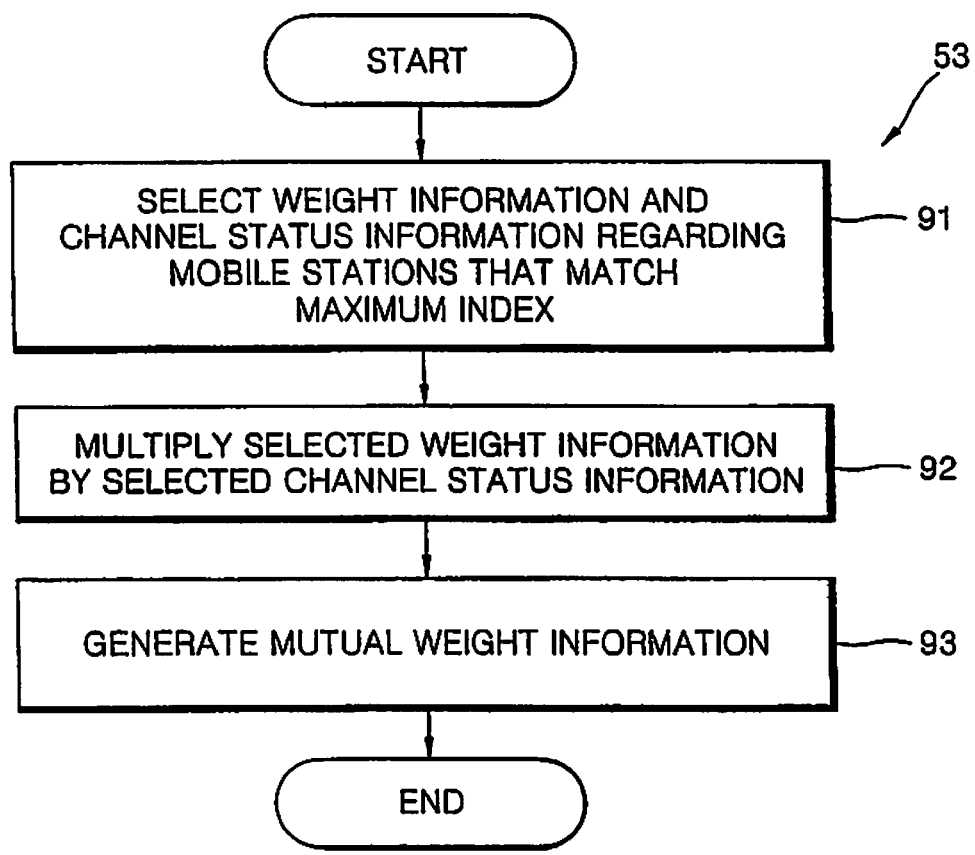
FIG. 9 is a flowchart of step 53 in FIG. 5.

FIG. 9 is a flowchart of an operation of step 53 in FIG. 5 according to the present invention, which includes generating mutual weight information based on the restored weight vector {v(k)}, channel status vector {λ(k)}, and mobile station selection information $i_{MAX}$ contained in the downlink investigation information (steps 91 through 93).

Figure 10:
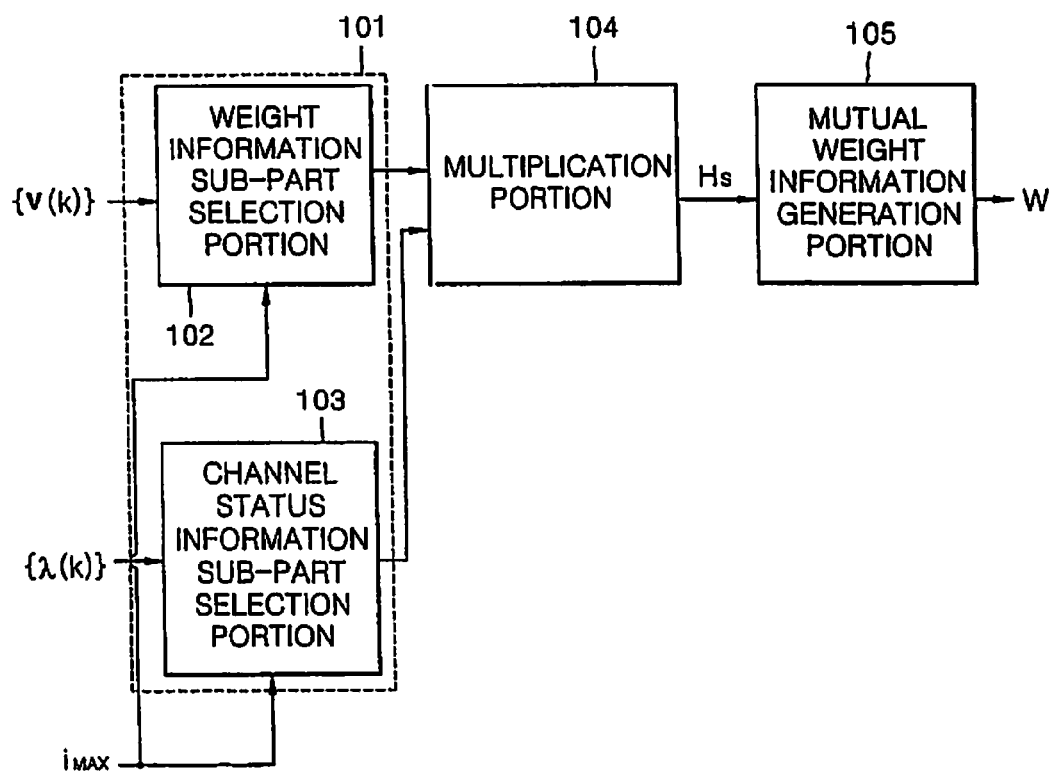
FIG. 10 is a block diagram of a downlink tracking information generation unit in FIG. 6.

FIG. 10 is a block diagram of an operation of the downlink tracking information generation unit 66 in FIG. 6 according to the present invention. The downlink tracking information generation unit 66 of FIG. 10 includes a channel information sub-part selection portion 101, a multiplication portion 104, and a mutual weight information generation portion 105. The channel information sub-part selection portion 101 includes a weight information sub-part selection portion 102 and a channel status information sub-part selection portion 103.

The operation of the downlink tracking information generation unit 66 in FIG. 10 will now be described in connection with the flowchart of FIG. 9.

The weight information sub-part selection portion 102 and the channel status information sub-part selection portion 103 in the channel information sub-part selection portion 101 select weight information and channel status information regarding the mobile stations that match the maximum index $i_{MAX}$ input from the downlink investigation information generation unit 65, from among the restored weight information and channel status information input from the feedback information restoration unit 62, respectively, and outputs the selected weight information and channel status information, respectively, to the multiplication portion 104 (step 91).

The multiplication portion 104 multiplies the weight information and channel status information input from the channel information sub-part selection portion 101, as expressed in formula (5) above, and outputs the product $h_k$, where $k=i_{MAX}$, to the mutual weight information generation portion 105 (step 92).

The mutual weight information generation portion 104 generates the float point mutual weight information based on the product ht, where $k=i_{MAX}$, input from the multiplication unit 104 using equation (8) above and outputs the generated mutual weight information W to the basis multiplication unit 68 (step 93). To make it easier to measure the channel information, the generated mutual weight information may be quantized to a degree that is suitable to be fed back prior to being output to the basis multiplication unit 67.

As described above, in a mobile communication apparatus using multiple base station and mobile station antennas and a mobile communication method used therein according to the present invention, downlink characteristics information transmitted from every mobile station to the base station is considered to achieve optimal beamforming and efficient data transmission at a low cost with a nominal peak throughput for multi-antennal communications.

Channel weight information and channel status information regarding every mobile station, which are transmitted from the mobile stations to the base station as feedback signals, are utilized. In addition, since channel investigation and tracking sections are separated in the present invention, so that the problem of delay in high-speed Doppler environments can be solved.

Furthermore, packet fairness information regarding a plurality of mobile stations is considered in calculating maximum transmission channel capacities, enabling selecting mobile stations for simultaneous data transmission.

Mutual weight information generated through investigation and tracking sections is quantized, allowing efficient channel information measurement. Generating channel information based on the channel weight information and channel status information regarding each of the mobile stations in the present invention ensures compatibility with existing standard protocols.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile station, comprising:
   a channel characteristics measurement unit that measures downlink characteristics based on pilot channel signals received through a mobile station antenna;
   a channel information determination unit that determines weight information and channel status information that maximizes transmission capacity based on the downlink characteristics, which are compressed to be fed back;
   an information feedback unit that converts the weight information and channel status information received from the channel information determination unit into the feedback signals and transmits the feedback signals through the mobile station antenna to a base station;
   a control information restoration unit that compensates for a distortion of a first control signal received from the base station based on the downlink characteristics and restores a second control signal from the distortion-compensated first control signal, the second control signal including information as to whether the data signals are from a desired basis matrix and information on a number of bits included;
   a data information restoration unit that restores data information that is received from every basis from the data signals received from the base station and the downlink characteristics;
   a data information selection unit that selects data information received from the desired basis matrix from among the data information received from all of the basis matrices in response to the second control signal, and outputs the selected data information; and
   a data information combination unit that combines the selected data information received from the data information selection unit and outputs the combined results as High-Speed Downlink Shared CHannel (HS-DSCH) signals.

2. A method of mobile communications performed in a mobile station, the method comprising:
   measuring downlink characteristics of multiple base station/mobile station antenna channels based on pilot channel signals transmitted from a base station;
   determining weight information and channel status information based on the downlink characteristics;
   converting the determined weight information and channel status information into the feedback signals;
   transmitting the feedback signals to the base station; and
   detecting High-Speed Downlink Shared CHannel (HS-DSCH) signals in units of a frame based on the downlink characteristics, and a first control signal and data signals, which are transmitted from the base station.

* * * * *